US008199172B2

(12) United States Patent
Kuo

(10) Patent No.: US 8,199,172 B2
(45) Date of Patent: Jun. 12, 2012

(54) METHOD AND APPARATUS OF COLOR ADJUSTMENT FOR A DISPLAY DEVICE

(75) Inventor: Chih-Chia Kuo, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 605 days.

(21) Appl. No.: 12/406,933

(22) Filed: Mar. 18, 2009

(65) Prior Publication Data

US 2010/0060670 A1 Mar. 11, 2010

(30) Foreign Application Priority Data

Sep. 9, 2008 (TW) ................................ 97134515 A

(51) Int. Cl.
*G09G 5/10* (2006.01)
*G06K 9/40* (2006.01)
*H04N 9/64* (2006.01)

(52) U.S. Cl. .......... 345/690; 358/1.9; 382/260; 348/649

(58) Field of Classification Search ................... 358/1.9; 382/167, 250, 260, 224; 345/589, 207, 594; 433/26; 362/583; 348/362, 734, 649, 222.1
See application file for complete search history.

(56) References Cited

U.S. PATENT DOCUMENTS

| | | | | |
|---|---|---|---|---|
| 5,793,445 | A * | 8/1998 | Lum et al. | 348/720 |
| 2004/0109608 | A1 * | 6/2004 | Love et al. | 382/224 |
| 2004/0213478 | A1 * | 10/2004 | Chesnokov | 382/260 |
| 2005/0213125 | A1 * | 9/2005 | Smith et al. | 358/1.9 |
| 2006/0182183 | A1 | 8/2006 | Winger | |
| 2007/0115370 | A1 * | 5/2007 | Sakamoto et al. | 348/222.1 |
| 2007/0126933 | A1 * | 6/2007 | Ting | 348/649 |
| 2008/0079968 | A1 * | 4/2008 | Ho et al. | 358/1.9 |
| 2008/0252628 | A1 * | 10/2008 | Han et al. | 345/207 |
| 2009/0180029 | A1 * | 7/2009 | Peng et al. | 348/649 |

* cited by examiner

*Primary Examiner* — Quan-Zhen Wang
*Assistant Examiner* — Lin Li
(74) *Attorney, Agent, or Firm* — Winston Hsu; Scott Margo

(57) ABSTRACT

A color adjustment method for a display device includes receiving a composite video signal including a first chrominance signal and a first luminance signal, generating a hue signal and a saturation signal according to at least the first chrominance signal, generating an intensity gain parameter according to the hue signal and the saturation signal, generating a saturation gain parameter according to the hue signal, generating a hue deviation parameter according to the hue signal, adjusting the first luminance signal according to the intensity gain parameter for generating a second luminance signal, and adjusting the first chrominance signal according to the hue deviation parameter and a mixed parameter generated according to the saturation gain parameter, for generating a second chrominance signal.

22 Claims, 10 Drawing Sheets

METHOD AND APPARATUS OF COLOR ADJUSTMENT FOR A DISPLAY DEVICE

BACKGROUND OF THE INVENTION

1. Field of the Invention

The present invention relates to a color adjustment method and related device for a display device, and more particularly, to a color adjustment method and related device for respectively adjusting each component of color space, e.g. HSI, of a composite video signal received by the display device.

2. Description of the Prior Art

With the advancement of communications and display technology, people can see favorite images, movies or TV programs by display devices, such as televisions or computers, and also have increasing demands on the display quality. For this reason, color adjustment techniques aim to simple control for users and precise adjustment to gain the best performance.

Human eyes can differentiate light of different wavelengths and have the largest response to light of three primary colors, red, green and blue. A general color display uses RGB color space to represent desired colors. Besides RGB, there are many popular color spaces that are color conversions of RGB, such as YIQ, YUV or YCbCr used in video system and CMYK used in color printing. In a video system, the transmitter usually transmits a composite video signal instead of RGB signal to the end user device. The composite video signal is composed of a luminance component representing the brightness of an image and a chrominance component representing the color information. For example, Y is the luminance component and Cb and Cr are blue-difference and red-difference chrominance components in YCbCr color space.

Please refer to FIG. 1, which is a color space diagram. As shown in FIG. 1, a color space is illustrated by six color axes of red, yellow, green, cyan, blue and magenta (RGBCMY). A conventional RGBCMY independent color adjustment method decides where a color signal is located in the color space according to RGB proportion of the color signal and then adjusts RGBCMY proportion independently. The RGBCMY independent color adjustment brings the best performance of the color signal but is not easily operated by users.

Another conventional color adjustment method generates a 2-dimensional look-up table for storing gain values corresponding to all possible chrominance signals and adjusts a chrominance signal to get the desired performance accordingly. However, the above methods only adjust hue and saturation of a color signal independently and do not adjust intensity of the color signal independently. In other words, a user cannot adjust contrast ratio of a displayed image by these conventional methods.

SUMMARY OF THE INVENTION

It is therefore a primary objective of the claimed invention to provide a color adjustment method and related device for a display device.

The present invention discloses a color adjustment method for a display device, the color adjustment method comprising receiving a composite video signal including a first chrominance signal and a first luminance signal, generating a hue signal and a saturation signal according to at least the first chrominance signal, generating an intensity gain parameter according to the hue signal and the saturation signal, generating a saturation gain parameter according to the hue signal, generating a hue deviation parameter according to the hue signal, adjusting the first luminance signal according to the intensity gain parameter for generating a second luminance signal, and adjusting the first chrominance signal according to the hue deviation parameter and a mixed parameter generated according to the saturation gain parameter, for generating a second chrominance signal.

The present invention further discloses a color adjustment device for a display device, the color adjustment device comprising a receiving terminal, a signal generation unit, an intensity mapping unit, a saturation mapping unit, a hue mapping unit, a luminance adjustment unit and a chrominance adjustment unit. The receiving terminal is utilized for receiving a composite video signal including a first chrominance signal and a first luminance signal. The signal generation unit is coupled to the receiving terminal and is utilized for generating a hue signal and a saturation signal according to at least the first chrominance signal. The intensity mapping unit, the saturation mapping unit and the hue mapping unit are all coupled to the signal generation unit and are utilized for generating an intensity gain parameter, a saturation gain parameter and a hue deviation parameter respectively according to the hue signal and the saturation signal. The luminance adjustment unit is coupled to the receiving terminal and the intensity mapping unit and is utilized for adjusting the first luminance signal according to the intensity gain parameter, for generating a second luminance signal. The chrominance adjustment unit is coupled to the receiving terminal, the saturation mapping unit and the hue mapping unit for adjusting the first chrominance signal according to the hue deviation parameter and a mixed parameter generated according to the saturation gain parameter, for generating a second chrominance signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
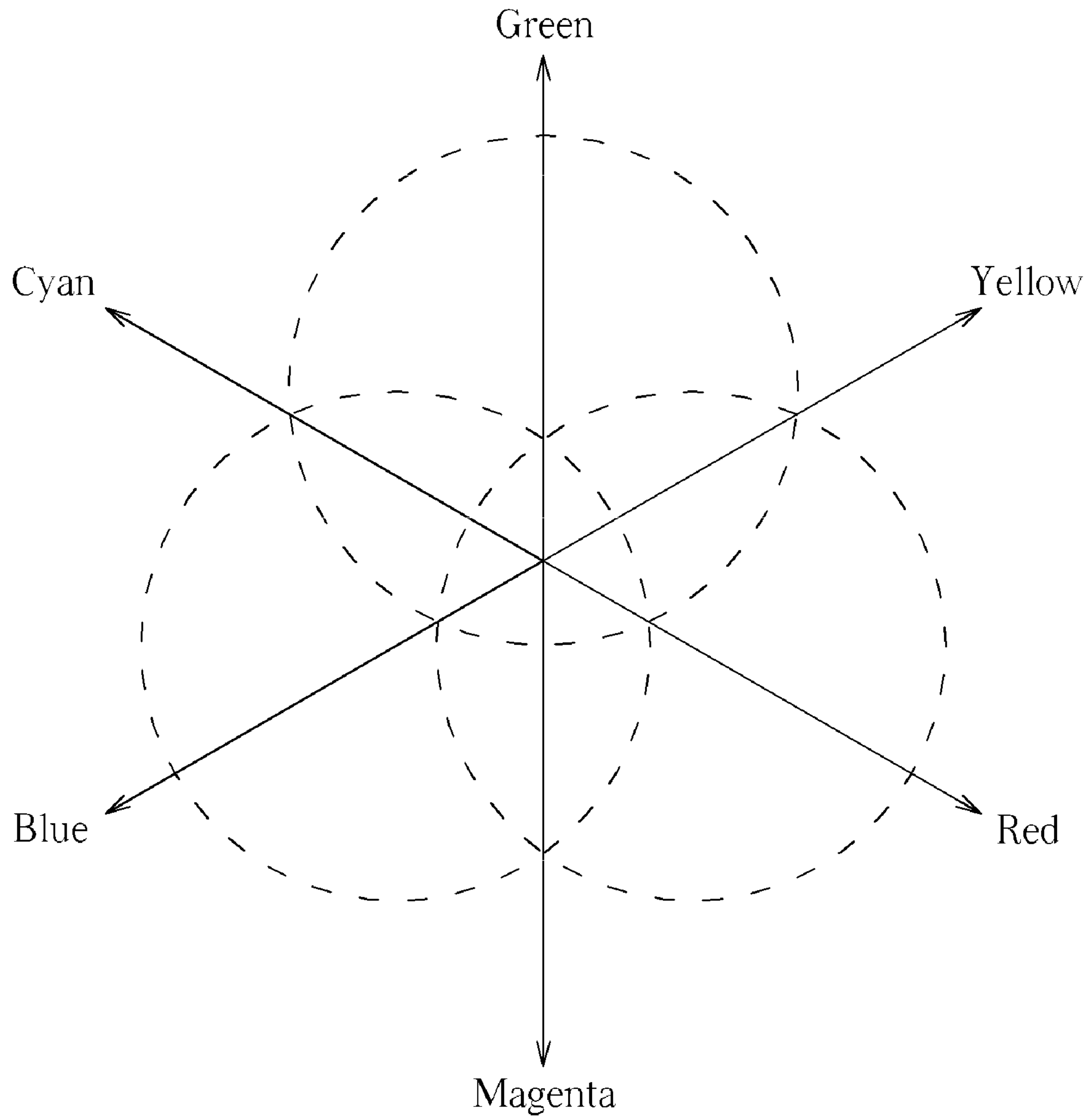
FIG. 1 is a color space diagram.
Figure 2:
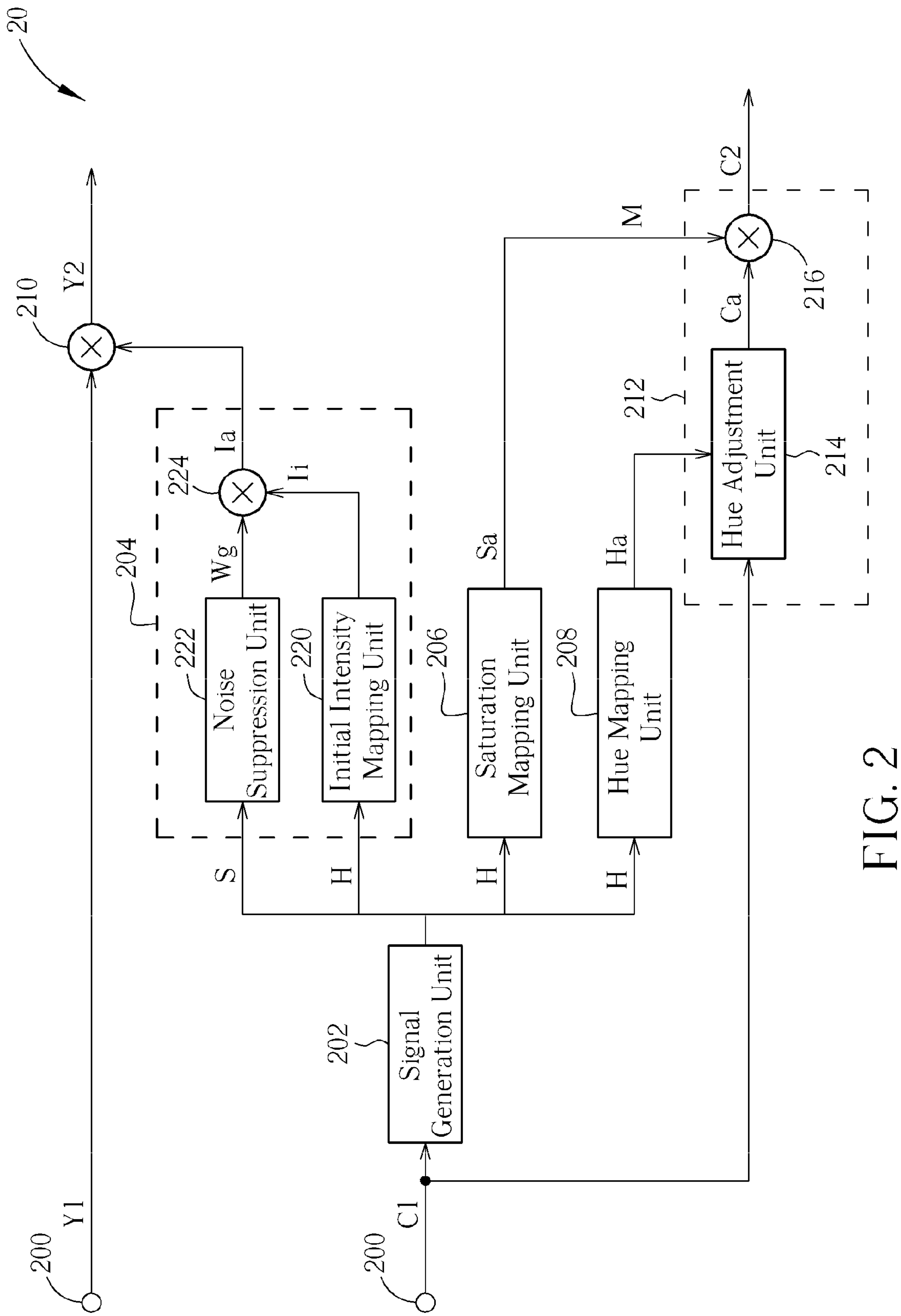
FIG. 2 is a schematic diagram of a color adjustment device according to an embodiment of the present invention.

Please refer to FIG. 2, which is a schematic diagram of a color adjustment device 20 according to an embodiment of the present invention. The color adjustment device 20 is utilized in a display device for adjusting color performance of the display device. Note that, the embodiment of the present invention adjusts hue, saturation and intensity (HSI) of a chrominance signal to get the preferred color performance because HSI color space is more intuitive to human eye than RGB, YCbCr, or any other color space.

The color adjustment device 20 comprises a receiving terminal 200, a signal generation unit 202, an intensity mapping unit 204, a saturation mapping unit 206, a hue mapping unit 208, a luminance adjustment unit 210 and a chrominance adjustment unit 212. The receiving terminal 200 is utilized for receiving a composite video signal composed of a chrominance signal C1 and a luminance signal Y1. The composite video signal can be represented by different color spaces, e.g. YCbCr or YUV. The signal generation unit 202 is coupled to the receiving terminal 200 and is utilized for generating a hue signal H and a saturation signal S according to the chrominance signal C1. For a composite video signal of YCbCr color space, the chrominance signal C1 is composed of a blue-difference signal Cb and a red-difference signal Cr. The hue signal H is an angle in the range of 0 to 360 degree representing each color. The hue signal H and the saturation signal S are derived from equations in the following:

$$H=\arctan(Cb/Cr)$$

$$S=\mathrm{sqrt}(Cr\times Cr+Cb\times Cb)$$

In addition, please note that the hue signal H and the saturation signal S can be generated by both the chrominance signal C1 and the luminance signal Y1. For example, the signal generation unit 202 can first generate a signal of RGB color space according to the chrominance signal C1 and the luminance signal Y1, and then transfer the RGB signal to the hue signal H and the saturation signal S.

The intensity mapping unit 204, the saturation mapping unit 206 and the hue mapping unit 208 are all coupled to the signal generation unit 202 and are utilized for generating an intensity gain parameter Ia, a saturation gain parameter Sa and a hue deviation parameter Ha respectively according to the hue signal H and the saturation signal S, to adjust H/S/I of the chrominance signal C1. The intensity gain parameter Ia is a gain that intensity of the chrominance signal C1 needs to be adjusted; the saturation gain parameter Sa is a gain that saturation of the chrominance signal C1 needs to be adjusted; and the hue deviation parameter Ha is an angle deviation that the hue signal H needs to be adjusted.

When the display device receives a composite video signal of poor saturation, intensity of the composite video signal is easily affected by noises. Preferably, the intensity gain parameter Ia generated by the intensity mapping unit 204 is a noise-suppressed parameter. As shown in FIG. 2, the intensity mapping unit 204 is different from the saturation mapping unit 206 and the hue mapping unit 208. The intensity mapping unit 204 comprises an initial intensity mapping unit 220, a noise suppression unit 222 and a multiplier 224. The initial intensity mapping unit 220 is coupled to the signal generation unit 202 and is utilized for generating an initial intensity gain parameter Ii according to the hue signal H. The noise suppression unit 222 is utilized for generating a weighting value Wg according to the saturation signal S. The multiplier 224 is coupled to the initial intensity mapping unit 220 and the noise suppression unit 222 and is utilized for performing a noise suppression procedure of multiplication on the initial intensity gain parameter Ii according to the weighting value Wg, for generating the intensity gain parameter Ia.

Figure 3:
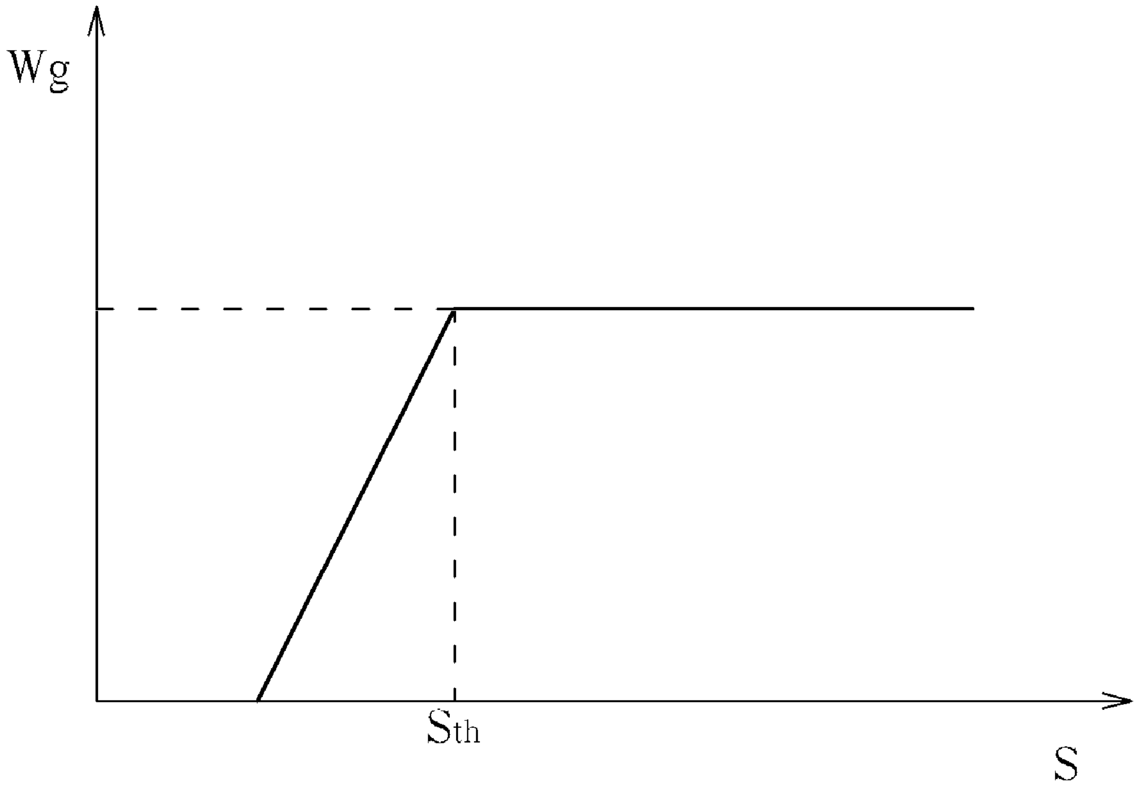
FIG. 3 is a relationship diagram of the weighting value to the saturation signal in FIG. 2.

Please refer to FIG. 3, which is a relationship diagram of the weighting value Wg to the saturation signal S according to an embodiment of the present invention. As shown in FIG. 3, the weighting value Wg can compensate the distortion of the intensity gain parameter Ii resulting from noises when the saturation signal S is lower than a threshold Sth. When the saturation signal S is larger than the threshold Sth, which means that intensity of the composite video signal is large enough to resist noise interference, the weighting value Wg stops increasing. Note that, the intensity mapping unit 204 is one of embodiments of the present invention, and any other similar unit that generates the weighting value Wg according to the saturation signal S and adjusts the initial intensity gain parameter Ii according to the weighting value Wg also belongs to the scope of the present invention.

Figure 4:
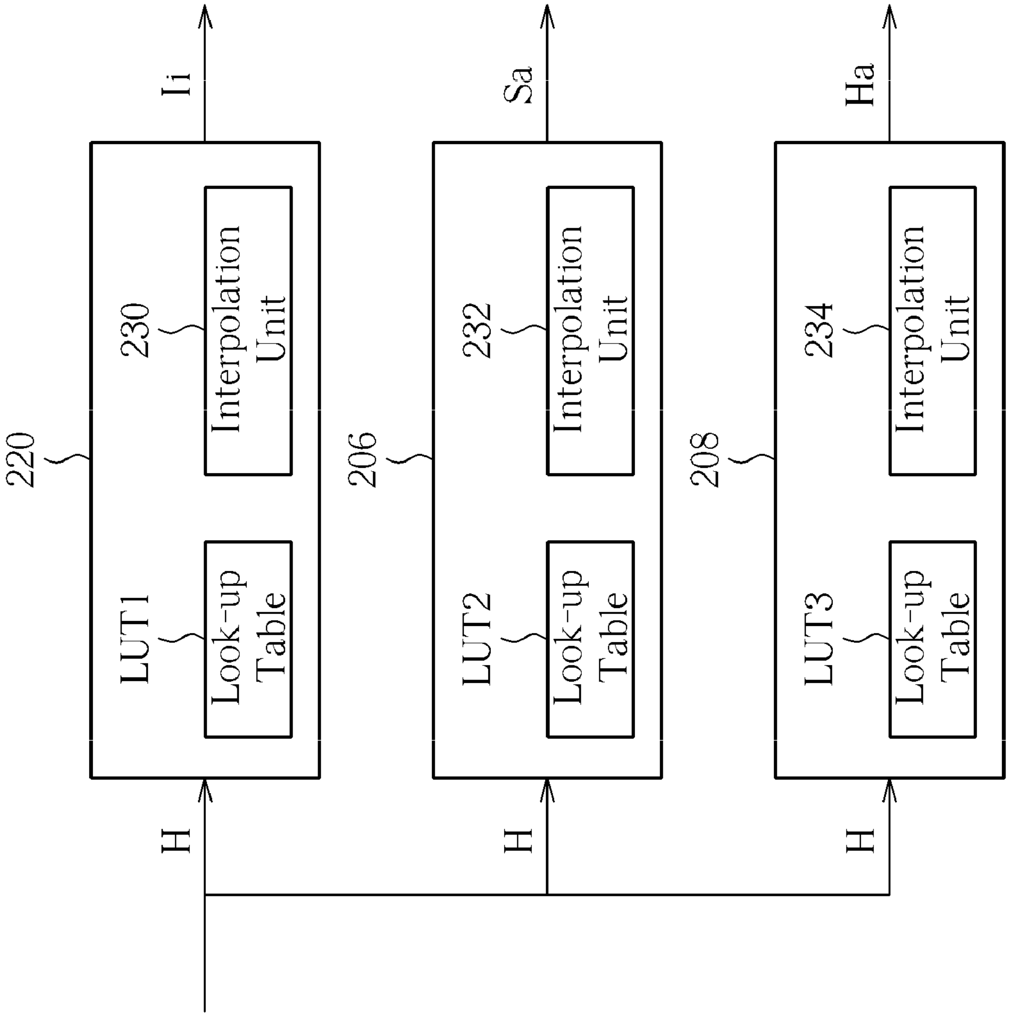
FIG. 4 is a schematic diagram of the initial intensity mapping unit, the saturation mapping unit and the hue mapping unit in FIG. 2.

The initial intensity mapping unit 220, the saturation mapping unit 206 and the hue mapping unit 208 operates in a similar way. Please refer to FIG. 4, which is a schematic diagram of the initial intensity mapping unit 220, the saturation mapping unit 206 and the hue mapping unit 208. The initial intensity mapping unit 220 comprises a look-up table LUT1 and an interpolation unit 230. The look-up table LUT1 is utilized for storing a plurality of intensity gain parameters. The interpolation unit 230 is utilized for performing interpolation on the hue signal H according to the plurality of intensity gain parameters for generating the initial intensity gain parameter Ii. Similarly, the saturation mapping unit 206 comprises a look-up table LUT2 storing a plurality of saturation gain parameters and an interpolation unit 232. The hue mapping unit 208 comprises a look-up table LUT3 storing a plurality of the hue deviation parameters and an interpolation unit 234. Operations of the saturation mapping unit 206 and the hue mapping unit 208 are similar to that of the initial intensity mapping unit 220 and are not repeated. In addition, it should be noted that if a number of the plurality of parameters stored in the look-up table is large enough, the display device can select a corresponding parameter directly from the look-up table instead of performing interpolation.

Figure 5:
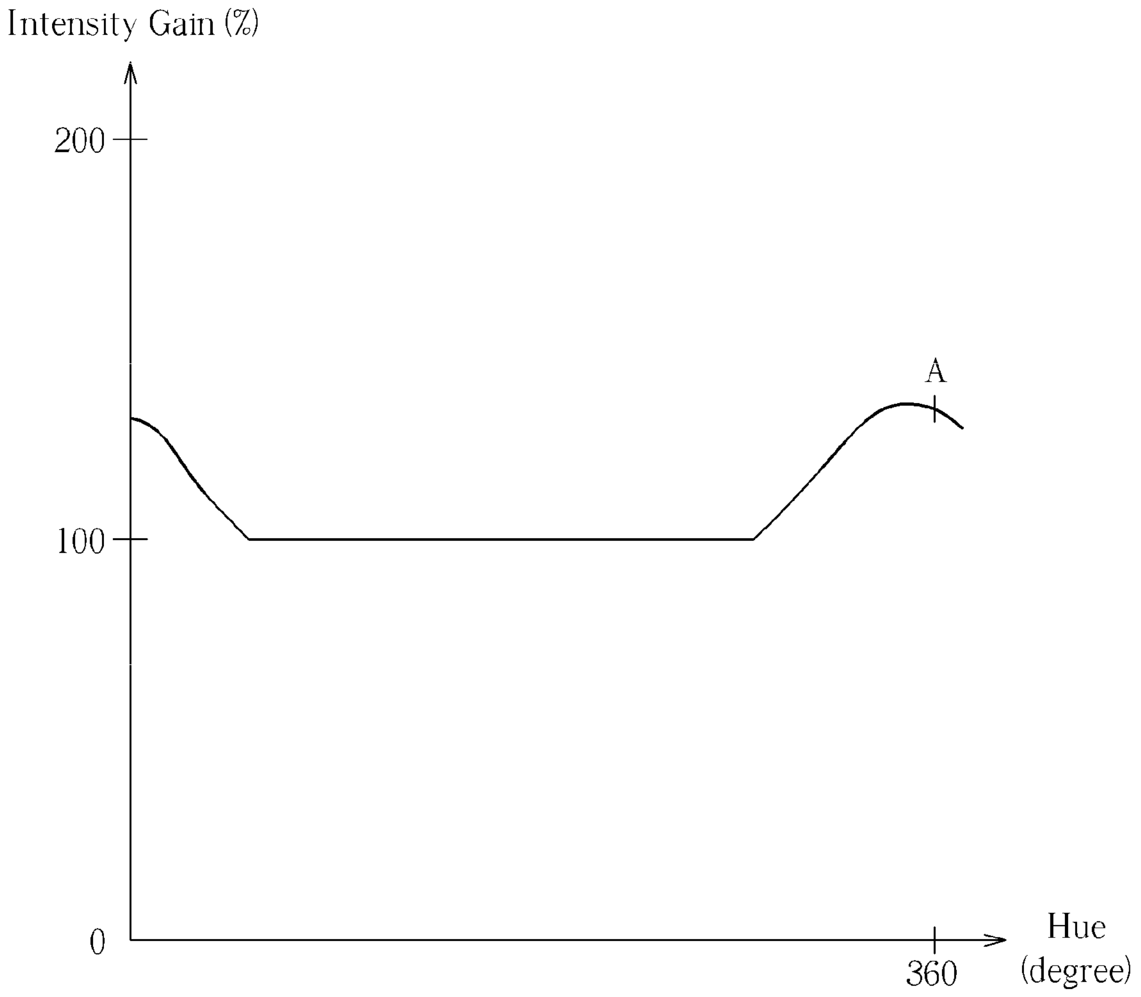
FIG. 5 is a diagram of intensity-hue look-up table according to an embodiment of the present invention.
Figure 6:
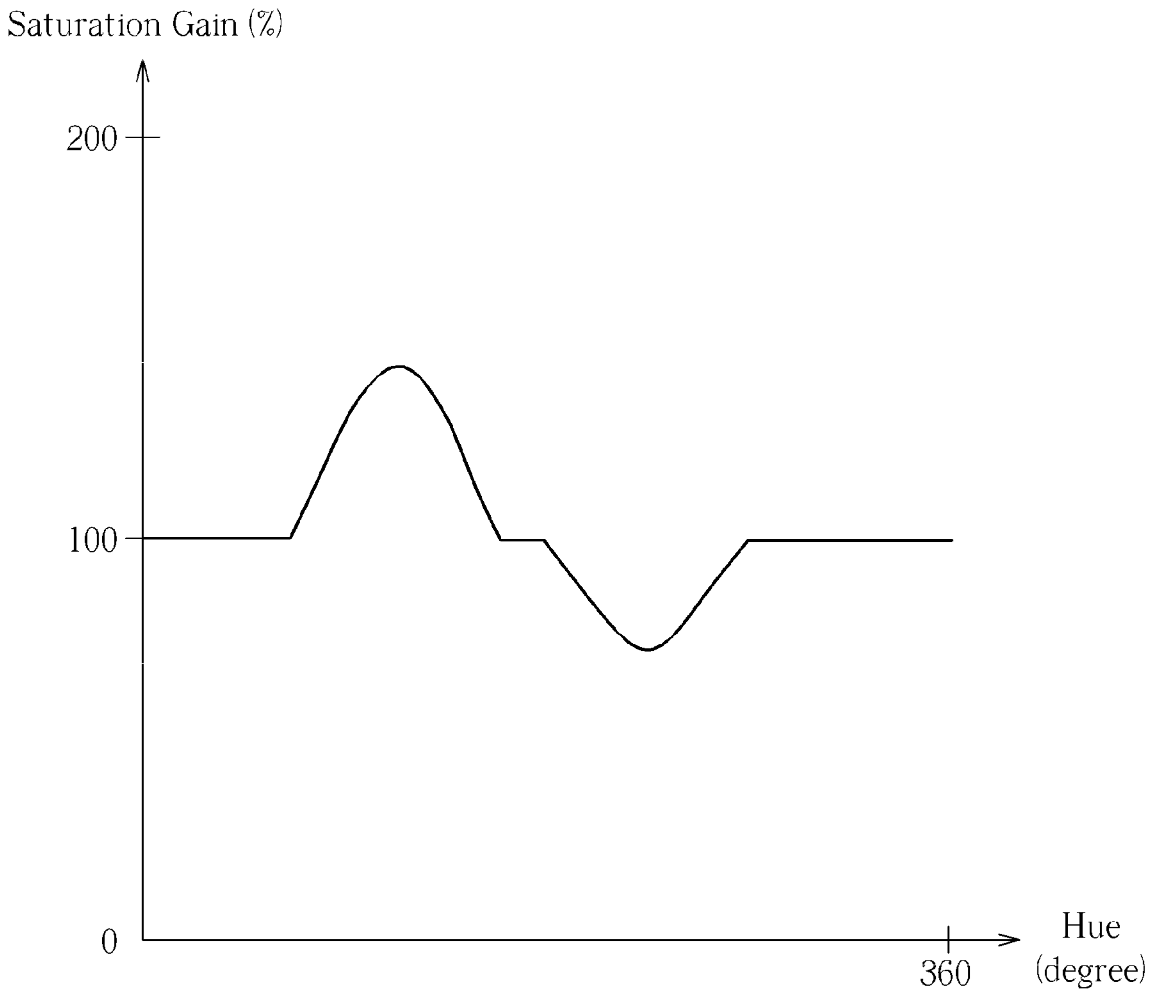
FIG. 6 is a diagram of saturation-hue look-up table according to an embodiment of the present invention.
Figure 7:
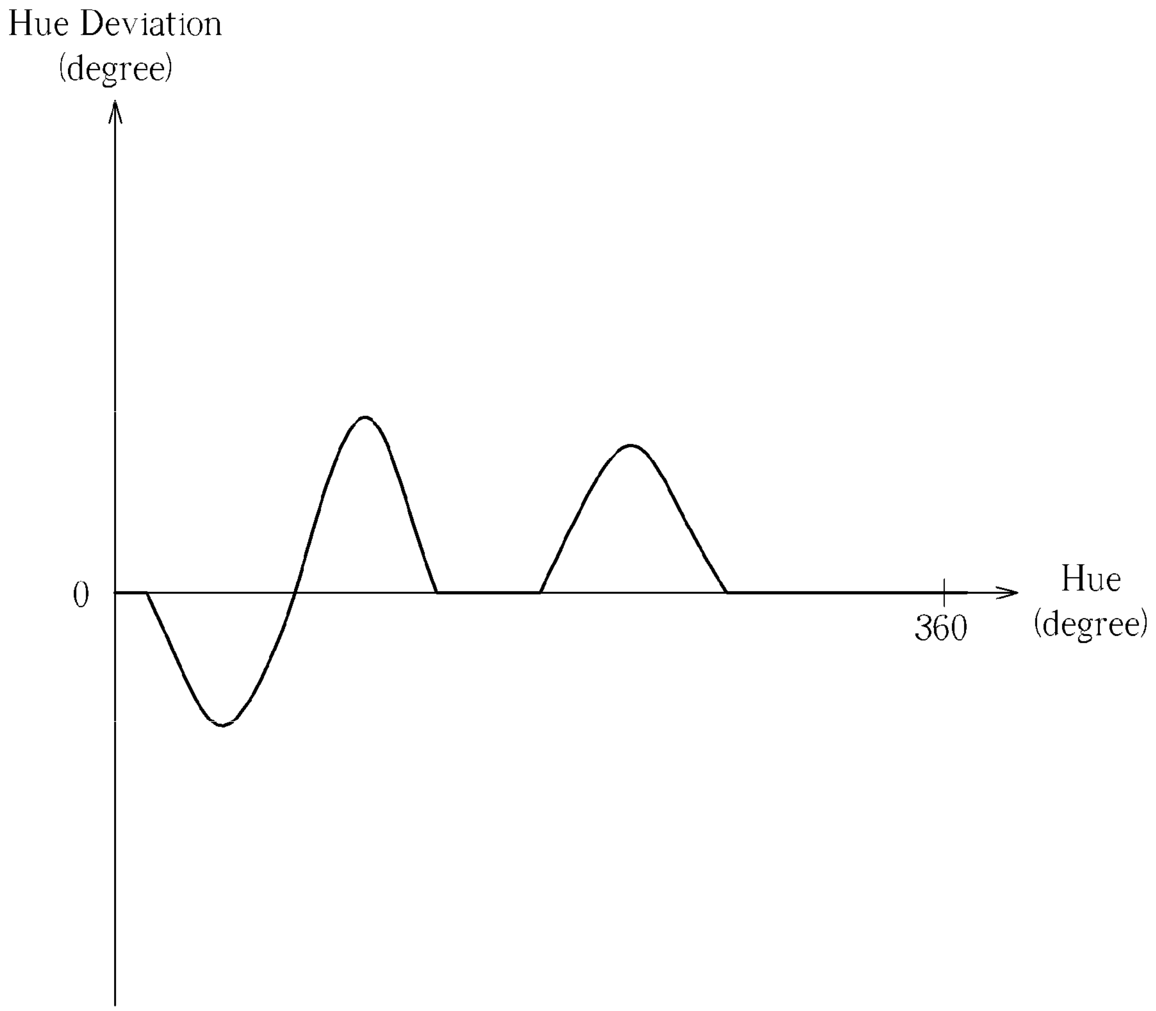
FIG. 7 is a diagram of hue-hue look-up table according to an embodiment of the present invention.

Please refer to FIG. 5 to FIG. 7, which are embodiments of the look-up tables LUT1, LUT2 and LUT3. FIG. 5 is a diagram of intensity-hue look-up table LUT1. FIG. 6 is a diagram of saturation-hue look-up table LUT2. FIG. 7 is a diagram of hue-hue look-up table LUT3. Take FIG. 5 as an example, the maximum value of the initial intensity gain parameters is 200% and the minimum value of the initial intensity gain parameters is 0%. When the hue signal corresponds to a point A, which represents blue, the initial intensity gain parameter Ii is around 125%. When the hue signal H is far from blue, the initial intensity gain parameter Ii goes to 100%, which means that intensity of the chrominance signal C1 is not changed via the initial intensity mapping unit 220.

After the intensity gain parameter Ia, the saturation gain parameter Sa and the hue deviation parameter Ha are generated, the display device adjusts the luminance signal Y1 and H/S/I of the chrominance signal C1 accordingly. The luminance adjustment unit 210 is coupled to the receiving terminal 200 and the intensity mapping unit 204, and is utilized for adjusting the luminance signal Y1 according to the intensity gain parameter Ia for generating a luminance signal Y2. In FIG. 2, the luminance adjustment unit 210 is a multiplier. In other embodiment of the present invention, the luminance adjustment unit 210 can be any other unit that can adjust the luminance signal Y1 according to the intensity gain parameter Ia. The chrominance adjustment unit 212 is coupled to the receiving terminal 200, the saturation mapping unit 206 and the hue mapping unit 208, and is utilized for adjusting the chrominance signal C1 according to the hue deviation parameter Ha and a mixed parameter M equal to the saturation gain parameter Sa for generating a chrominance signal C. In FIG. 2, the chrominance adjustment unit 212 comprises a hue adjustment unit 214 and a multiplier 216. The hue adjustment unit 214 is coupled to the receiving terminal 200 and the hue mapping unit 208, and is utilized for multiplying the chrominance signal C1 by a rotation matrix generated by the hue deviation parameter Ha for generating an output signal Ca. The multiplier 216 is coupled to the hue adjustment unit 214 and the saturation mapping unit 206, and is utilized for multiplying the output signal Ca by the mixed parameter M for generating the chrominance signal C2.

Figure 8:
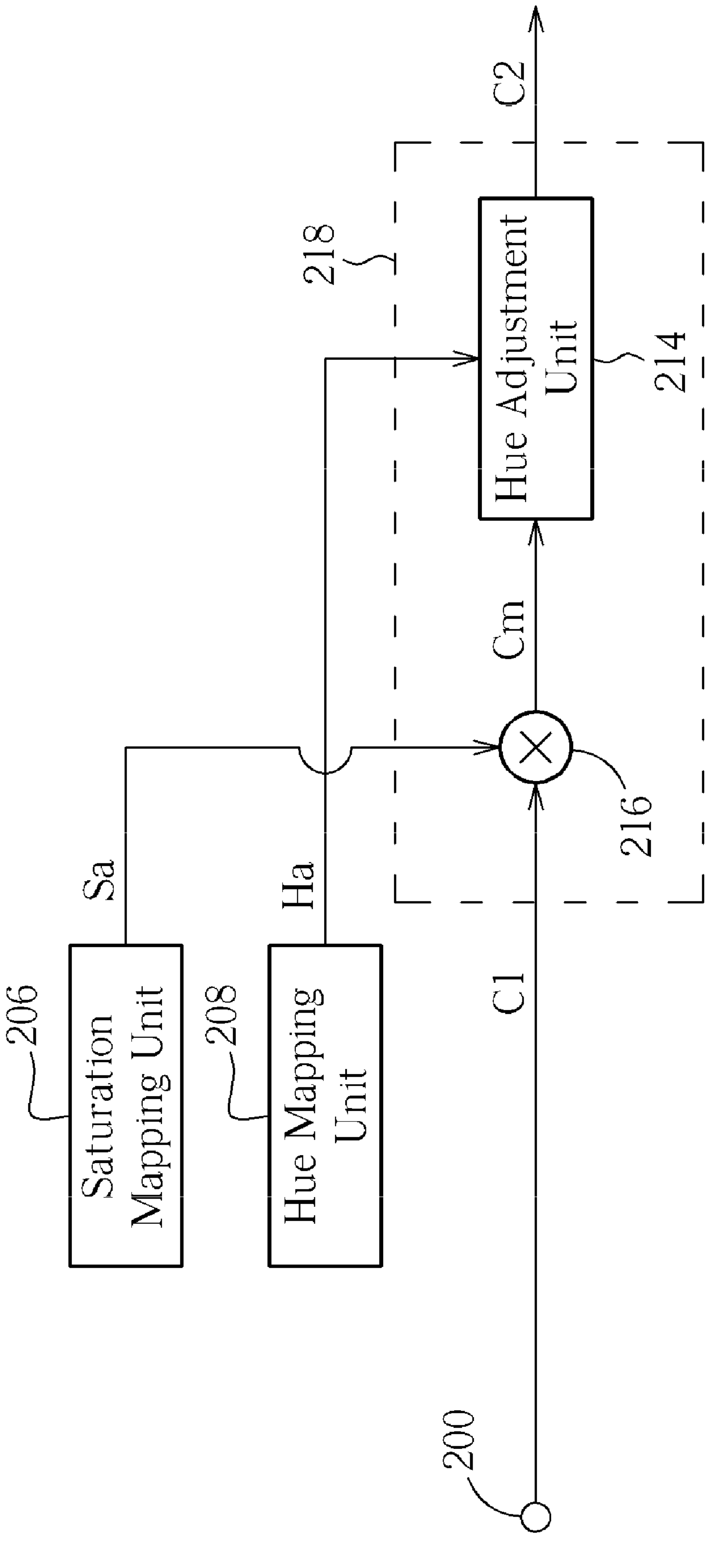
FIG. 8 is a schematic diagram of a chrominance adjustment unit according to an embodiment of the present invention.

Note that, the chrominance signal C2 can be generated by another embodiment of the present invention. Please refer to FIG. 8, which is a schematic diagram of a chrominance adjustment unit 218 according to an embodiment of the present invention. In the chrominance adjustment unit 218, the multiplier 216 is coupled to the receiving terminal 200 and the saturation mapping unit 206; the hue adjustment unit 214 is coupled to the multiplier 216 and the hue mapping unit 208. In FIG. 8, the multiplier 216 is utilized for multiplying the chrominance signal C1 by the mixed parameter M for generating an output signal Cm; the hue adjustment unit 214 is utilized for multiplying the rotation matrix generated by the hue deviation parameter Ha by the output signal Cm for generating the chrominance signal C2.

Figure 9:
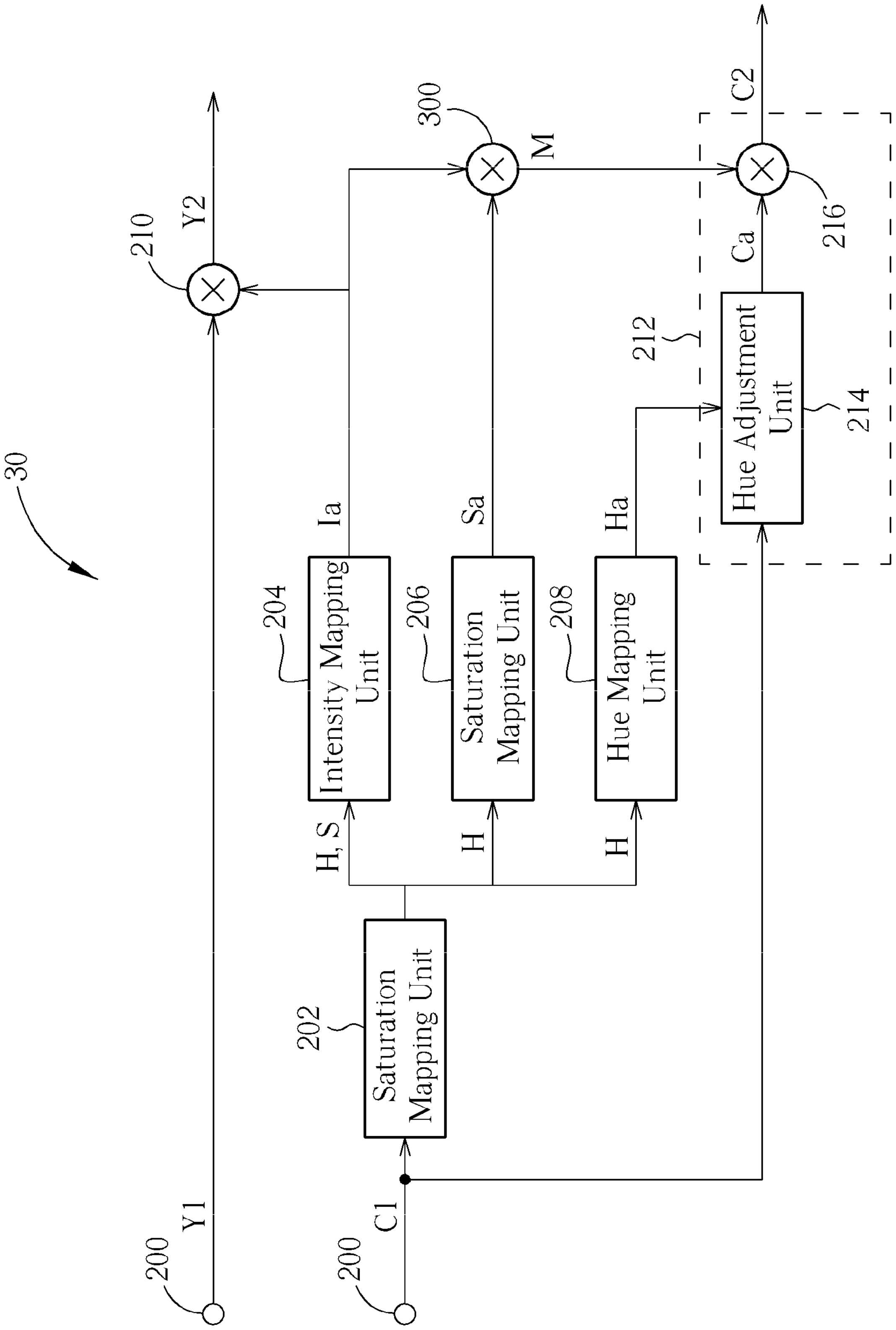
FIG. 9 is a color adjustment device according to an embodiment of the present invention.

In FIG. 2, the mixed parameter M is equal to the saturation gain parameter Sa. In other words, the chrominance signal C1 is adjusted according to the saturation gain parameter Sa. Please refer to FIG. 9, which is a color adjustment device 30 according to an embodiment of the present invention. The color adjustment device 30 is similar to the color adjustment device 20 and further comprises a multiplier 300. In FIG. 9, the multiplier 300 is coupled to the intensity mapping unit 204, the saturation mapping unit 206 and the chrominance adjustment unit 212, and is utilized for multiplying the saturation gain parameter Sa by the intensity gain parameter Ia for generating the mixed parameter M sent to the chrominance adjustment unit 212. Therefore, the chrominance signal C1 is not only adjusted according to the saturation gain parameter Sa, but also according to the intensity gain parameter Ia.

Figure 10:
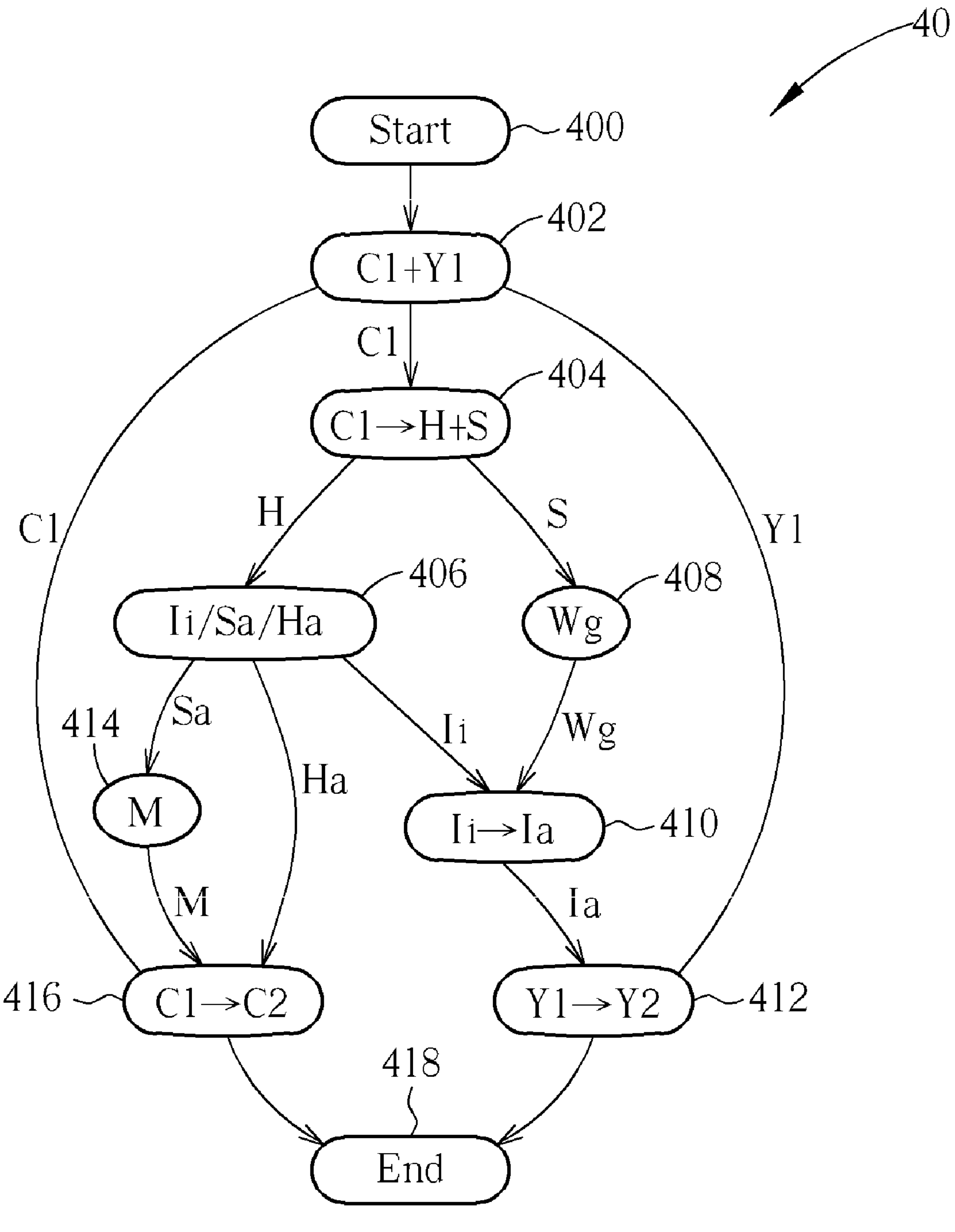
FIG. 10 is a flowchart of a process according to an embodiment of the present invention.

In summary, via the color adjustment device according to the embodiment of the present invention, the display device receives the composite video signal composed of the chrominance signal C1 and the luminance signal Y1, generates the hue signal H and the saturation signal S according to the chrominance signal C1, adjusts H/S/I of the chrominance signal C1 to generate the chrominance signal C2 and the luminance signal Y2. In addition, the display device adjusts the luminance signal Y1 according to the weighting value Wg to generate the luminance signal Y2. Therefore, intensity distortion of low-saturation composite video signal resulting from noises is compensated. Please note that, the embodiment of the present invention adjusts H/S/I, for example, of the chrominance signal C1 respectively. The color space presentation of the chrominance signal C1 is not limited to HSI; any other color space, such as HSL or HSV, can also be applied in the present invention Operation of the color adjustment device 30 in FIG. 9 can be implemented by a process 40. Please refer to FIG. 10, which is a flowchart of the process 40 according to an embodiment of the present invention. The process 40 comprises the following steps:

Step 400: Start.

Step 402: The receiving terminal 200 receives the composite video signal including the chrominance signal C1 and the luminance signal Y1.

Step 404: The signal generation unit 202 generates the hue signal H and the saturation signal S according to the chrominance signal C1.

Step 406: The initial intensity mapping unit 220, the saturation mapping unit 206 and the hue mapping unit 208 generates the initial intensity gain parameter Ii, the saturation gain parameter Sa and the hue deviation parameter Ha respectively according to the hue signal H.

Step 408: The noise suppression unit 222 generates the weighting value according to the saturation signal S.

Step 410: The multiplier 224 performs a noise suppression procedure on the initial intensity gain parameter Ii according to the weighting value Wg, for generating the intensity gain parameter Ia.

Step 412: The luminance adjustment unit 210 adjusts the luminance signal Y1 according to the intensity gain parameter Ia for generating the luminance signal Y2.

Step 414: The multiplier 300 generates the mixed parameter M according to the saturation gain parameter Sa and the intensity gain parameter Ia.

Step 416: The chrominance adjustment unit 210 adjusts the chrominance signal C1 according to the mixed parameter M and the hue deviation parameter Ha for generating the chrominance signal C2.

Step 418: Output the chrominance signal C2 and the luminance signal Y2.

Operations of each steps of the process 40 are described in the above description of the color adjustment device 20, and are not repeated again. Note that, the process 40 is utilized in the color adjustment device 30, and the mixed parameter M is a product of the saturation gain parameter Sa and the intensity gain parameter Ia. A similar process that modifies Step 414 to use the saturation gain parameter Sa as the mixed parameter M can be applied in the color adjustment device 20. According to the process 40, the display device can adjust color performance and decrease impact of noise interference in the low-saturation composite video signal.

As mentioned previously, the conventional RGBCMY color adjustment is not intuitive and is hard to operate, and the color adjustment using 2-dimensional look-up table only provides independent adjustment of hue and saturation and can not adjust intensity independently, and therefore the contrast ratio of the displayed image can not be adjusted independently. Compared with the prior art, according to the present invention, the display device generates the hue signal and the saturation signal according to the chrominance component of the received composite video signal, and adjusts hue, saturation and intensity of the chrominance signal so as to adjust the chrominance signal and the luminance signal. Therefore, the user of the display device can adjust color and contrast ratio independently to get the best performance.

Those skilled in the art will readily observe that numerous modifications and alterations of the device and method may be made while retaining the teachings of the invention.

What is claimed is:

1. A color adjustment method for a display device, the color adjustment method comprising:

receiving a composite video signal including a first chrominance signal and a first luminance signal;

generating a hue signal and a saturation signal according to at least the first chrominance signal;

generating an intensity gain parameter according to the hue signal and the saturation signal;

generating a saturation gain parameter according to the hue signal;

generating a hue deviation parameter according to the hue signal;

adjusting the first luminance signal according to the intensity gain parameter for generating a second luminance signal; and adjusting the first chrominance signal according to the hue deviation parameter and a mixed parameter generated according to the saturation gain parameter, for generating a second chrominance signal; and generating a weighting value according to the saturation signal.

2. The color adjustment method of claim 1, wherein the step of generating the intensity gain parameter comprises:

generating an initial intensity gain parameter according to the hue signal; and performing a noise suppression procedure on the initial intensity gain parameter according to the weighting value, for generating the intensity gain parameter.

3. The color adjustment method of claim 2, wherein the step of generating the initial intensity gain parameter comprises:

performing interpolation on the hue signal according to a plurality of intensity gain parameters, for generating the initial intensity gain parameter.

4. The color adjustment method of claim 1, wherein the step of generating the saturation gain parameter comprises:

performing interpolation on the hue signal according to a plurality of saturation gain parameters, for generating the saturation gain parameter.

5. The color adjustment method of claim 1, wherein the step of generating the hue deviation parameter comprises:

performing interpolation on the hue signal according to a plurality of hue deviation parameters, for generating the hue deviation parameter.

6. The color adjustment method of claim 1, wherein the step of adjusting the first luminance signal for generating the second luminance signal comprises:

multiplying the intensity gain parameter by the first luminance signal, for generating the second luminance signal.

7. The color adjustment method of claim 1, wherein the step of adjusting the first chrominance signal for generating the second chrominance signal comprises:

multiplying the first chrominance signal by a rotation matrix generated by the hue deviation parameter for generating an output signal; and multiplying the output signal by the mixed parameter for generating the second chrominance signal.

8. The color adjustment method of claim 1, wherein the step of adjusting the first chrominance signal for generating the second chrominance signal comprises:

multiplying the first chrominance signal by the mixed parameter for generating an output signal; and multiplying the output signal by a rotation matrix generated by the hue deviation parameter for generating the second chrominance signal.

9. The color adjustment method of claim 1, wherein the mixed parameter is the saturation gain parameter.

10. The color adjustment method of claim 1, wherein the mixed parameter is a product of the saturation gain parameter and the intensity gain parameter.

11. The color adjustment method of claim 1, wherein the step of generating the hue signal and the saturation signal according to at least the first chrominance signal comprises:

generating the hue signal and the saturation signal according to the first chrominance signal and the first luminance signal.

12. A color adjustment device for a display device, the color adjustment device comprising:

a receiving terminal for receiving a composite video signal including a first chrominance signal and a first luminance signal;

a signal generation unit coupled to the receiving terminal for generating a hue signal and a saturation signal according to at least the first chrominance signal;

an intensity mapping unit coupled to the signal generation unit for generating an intensity gain parameter according to the hue signal and the saturation signal;

a saturation mapping unit coupled to the signal generation unit for generating a saturation gain parameter according to the hue signal;

a hue mapping unit coupled to the signal generation unit for generating a hue deviation parameter according to the hue signal;

a luminance adjustment unit coupled to the receiving terminal and the intensity mapping unit for adjusting the first luminance signal according to the intensity gain parameter, for generating a second luminance signal; and a chrominance adjustment unit coupled to the receiving terminal, the saturation mapping unit and the hue mapping unit for adjusting the first chrominance signal according to the hue deviation parameter and a mixed parameter generated according to the saturation gain parameter, for generating a second chrominance signal;

wherein the intensity mapping unit further comprises a noise suppression for generating a weighting value according to the saturation signal.

13. The color adjustment device of claim 12, wherein the intensity mapping unit comprises:

an initial intensity mapping unit coupled to the signal generation unit for generating an initial intensity gain parameter according to the hue signal; and a multiplier coupled to the initial intensity mapping unit and the noise suppression unit for performing a noise suppression procedure on the initial intensity gain parameter according to the weighting value, for generating the intensity gain parameter.

14. The color adjustment device of claim 13, wherein the initial intensity mapping unit comprises:

a look-up table for storing a plurality of intensity gain parameters; and an interpolation unit for performing interpolation on the hue signal according to the plurality of intensity gain parameters, for generating the initial intensity gain parameter.

15. The color adjustment device of claim 12, wherein the saturation mapping unit comprises:

a look-up table for storing a plurality of saturation gain parameters; and an interpolation unit for performing interpolation on the hue signal according to the plurality of saturation gain parameters, for generating the saturation gain parameter.

16. The color adjustment device of claim 12, wherein the hue mapping unit comprises:

a look-up table for storing a plurality of hue deviation parameters; and an interpolation unit for performing interpolation on the hue signal according to the plurality of hue deviation parameters, for generating the hue deviation parameter.

17. The color adjustment device of claim 12, wherein the luminance adjustment unit is a multiplier for multiplying the first luminance signal by the intensity gain parameter, for generating the second luminance signal.

18. The color adjustment device of claim 12, wherein the chrominance adjustment unit comprises:

a hue adjustment unit coupled to the receiving terminal and the hue mapping unit for multiplying the first chrominance signal by a rotation matrix generated by the hue deviation parameter for generating an output signal; and a multiplier coupled to the hue adjustment unit and the saturation mapping unit for multiplying the output signal by the mixed parameter for generating the second chrominance signal.

19. The color adjustment device of claim 12, wherein the chrominance adjustment unit comprises:

a multiplier coupled to the receiving terminal and the saturation mapping unit for multiplying the first chrominance signal by the mixed parameter for generating an output signal; and a hue adjustment unit coupled to the multiplier and the hue mapping unit for multiplying the output signal by a rotation matrix generated by the hue deviation parameter for generating the second chrominance signal.

20. The color adjustment device of claim 12, wherein the mixed parameter is the saturation gain parameter.

21. The color adjustment device of claim 12 further comprising a multiplier coupled to the intensity mapping unit, the saturation mapping unit and the chrominance adjustment unit for multiplying the saturation gain parameter by the intensity gain parameter, for generating the mixed parameter.

22. The color adjustment device of claim 12, wherein the signal generation unit is further utilized for generating the hue signal and the saturation signal according to the first chrominance signal and the first luminance signal.

* * * * *